C. W. PRICE.
WHEEL.
APPLICATION FILED FEB. 13, 1909.
954,048.
Patented Apr. 5, 1910.
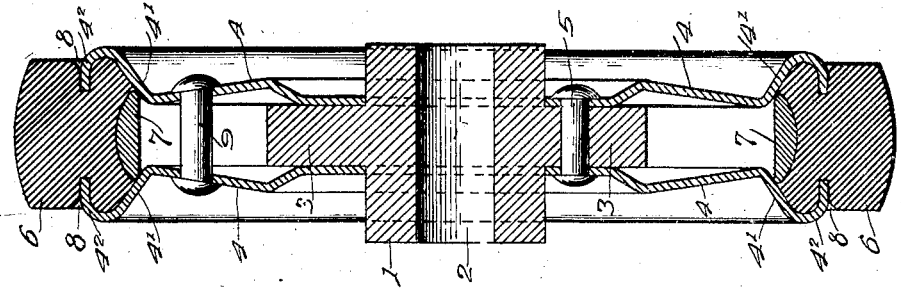
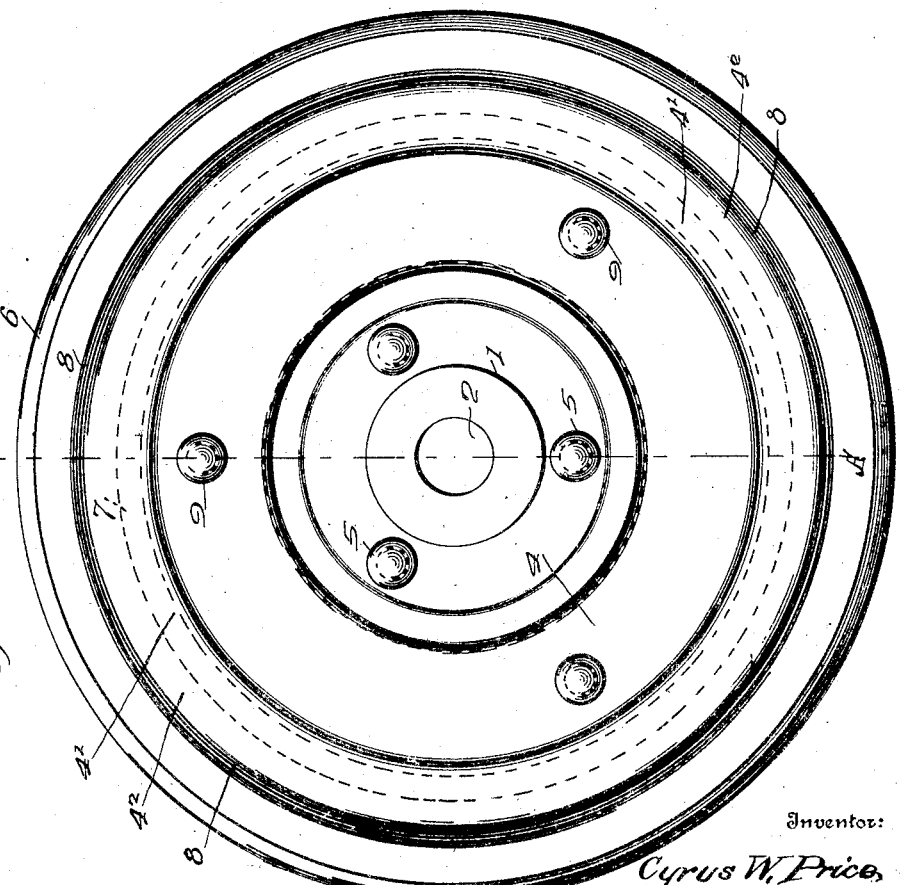
Witnesses:
G. Howard Walmsley.
Stanley Pike.
Inventor:
Cyrus W. Price,
By Eugene L. Arnott,
Attorney

UNITED STATES PATENT OFFICE.

CYRUS W. PRICE, OF GREENFIELD, OHIO.

WHEEL.

954,048.  Specification of Letters Patent.  Patented Apr. 5, 1910.

Application filed February 13, 1909. Serial No. 477,829.

*To all whom it may concern:*

Be it known that I, CYRUS W. PRICE, a citizen of the United States, residing at Greenfield, in the county of Highland and State of Ohio, have invented a new and useful Improvement in Wheels, of which the following is a specification.

This invention relates to an improved wheel of the character described which is strong and durable and may be cheaply constructed. This wheel is designed especially for use on trucks requiring rubber tires, but may be used wherever a wheel of this character is desired.

In the drawings, Figure 1 is a side elevation of a wheel embodying my invention. Fig. 2 is a cross section on line A A of Fig. 1.

The hub 1 has the usual central opening 2 for the axle, and the annular flange 3. The plates 4 4, which are preferably stamped out of sheet metal, have central openings to receive the hub 1. Plates 4 4 fit against the annular flange 3 of the hub. Rivets or bolts 5 5 extend through the plates 4 4 and flange 3 and clamp the plates firmly against the flange.

The tire 6 is preferably made of rubber and is secured to a metallic or non-flexible ring or base portion 7 preferably by vulcanization. The ring 7 may be in cross section in the form of half oval as shown. The tire 6 has an annular groove or recess 8 at either side.

The plates 4 4 are bent outwardly at 4' 4' and then curved until the outer edges approach each other at $4^2$ $4^2$, thus forming an annular recess between the outer edges of plates 4 4. Tire 6 and ring 7 are placed in this annular recess. The outer edges $4^2$ $4^2$ of plates 4 4 fit in the annular grooves 8 8 of tire 6, and ring 7 engages the bent portions 4' 4' of plates 4 4. Rivets or bolts 9 9 extend through plates 4 4 and draw them together. This causes the bent portions $4^2$ $4^2$ of plates 4 4 to firmly engage the grooved tire 6, and the bent portions 4' 4' of plates 4 4 to firmly engage ring 7. The portions 4' 4' being formed at an acute angle with the center line of the wheel, it is obvious that the ring 7 may slip laterally and seat itself firmly upon the annular portions 4' 4' of plates 4 4 when said plates are drawn toward each other. This form of construction tends to stretch ring 7, and every portion of said ring is brought in firm contact with the portions 4' 4' of the plates. This arrangement prevents any rattling or loose play at any part of ring 7. The ring 7 prevents the bent portions $4^2$ $4^2$ from biting unduly into the rubber tire 6.

It is obvious that when ring 7 is made in the form of half oval and is vulcanized within tire 6 the tire cannot readily slip sidewise upon the ring. The ring keeps the tire in the form of a circle. Ring 7 also forms a suitable backing for tire 6, and strengthens the tire and prevents the tire from pushing unduly inwardly between plates 4 4.

In small wheels the rivets or bolts 9 9 may be dispensed with. In large wheels a larger number of rivets or bolts may be required.

Having thus fully described my invention, what I claim as new and desire to secure by Letters Patent, is—

1. In a wheel, the combination, of plates placed opposite each other and forming the side portions of the wheel, a hub in central openings in said plates, a non-flexible ring between the outer portions of said plates, said ring being half oval in cross section, and an elastic tire vulcanized upon said ring, substantially as set forth.

2. In a wheel, the combination, of plates placed opposite each other and forming the side portions of the wheel, a hub in central openings in said plates, a non-flexible ring between the outer portions of said plates, an elastic tire resting upon said ring, said plates being formed at their outer portions so that the parts in engagement with said ring are at an acute angle with the center line of the wheel, whereby said ring may slip laterally upon said angular portions of the plates, thus firmly seating itself when said plates are drawn toward each other, substantially as set forth.

3. In a wheel, the combination, of plates placed opposite each other and forming the side portions of the wheel, a hub in central openings in said plates, a non-flexible ring between the outer portions of said plates, an elastic tire resting upon said ring, said plates being formed at their outer portions so that the parts in engagement with said ring are at an acute angle with the center line of the wheel, whereby said ring may slip laterally upon said angular portions of the plates, thus firmly seating itself when said plates are drawn toward each other, and the outer edges of said plates being formed so that they engage said elastic tire when said plates are drawn toward each other, substantially as set forth.

CYRUS W. PRICE.

Witnesses:
J. G. WHITAKER,
E. L. ARNOTT.